United States Patent [19]
Hope

[11] 4,020,578
[45] May 3, 1977

[54] NIGHT FISHING SIGNAL

[75] Inventor: William K. Hope, Gastonia, N.C.

[73] Assignee: Hope Plastics Corporation (Entire), Gastonia, N.C.

[22] Filed: Sept. 5, 1975

[21] Appl. No.: 610,892

[52] U.S. Cl. .................................. 43/17; 240/6.4 F
[51] Int. Cl.² ........................................ A01K 97/12
[58] Field of Search .............. 43/17, 17.1, 17.5, 16, 43/15, 17.6; 240/6.4 F

[56] References Cited
UNITED STATES PATENTS

| | | | |
|---|---|---|---|
| 541,354 | 6/1895 | Hartmann | 43/16 |
| 2,770,906 | 11/1956 | Hood | 43/16 |
| 2,948,981 | 8/1960 | Kowalczyk | 43/16 |
| 3,308,569 | 3/1967 | Foellner | 43/17.6 |
| 3,721,033 | 3/1973 | Haynes | 43/17.6 |
| 3,740,888 | 6/1973 | Young, Jr. | 43/17 |
| 3,798,822 | 3/1974 | Lampus | 43/17.5 |
| 3,868,668 | 2/1975 | Woodbury | 43/17 |
| 3,878,635 | 4/1975 | Trosper et al. | 43/17 |
| 3,913,256 | 10/1975 | Morris et al. | 43/17.5 |
| 3,940,868 | 3/1976 | Northcott | 43/17.6 |
| 3,959,910 | 6/1976 | Montgomery | 43/17 |

Primary Examiner—Louis G. Mancene
Assistant Examiner—Peter K. Skiff
Attorney, Agent, or Firm—Clarence A. O'Brien; Harvey B. Jacobson

[57] ABSTRACT

A night fishing signal device for mounting on a fishing rod so that movement of the fishing line which indicates the presence of a fish will actuate the device and thereby cause a light signal to flash intermittently.

2 Claims, 5 Drawing Figures

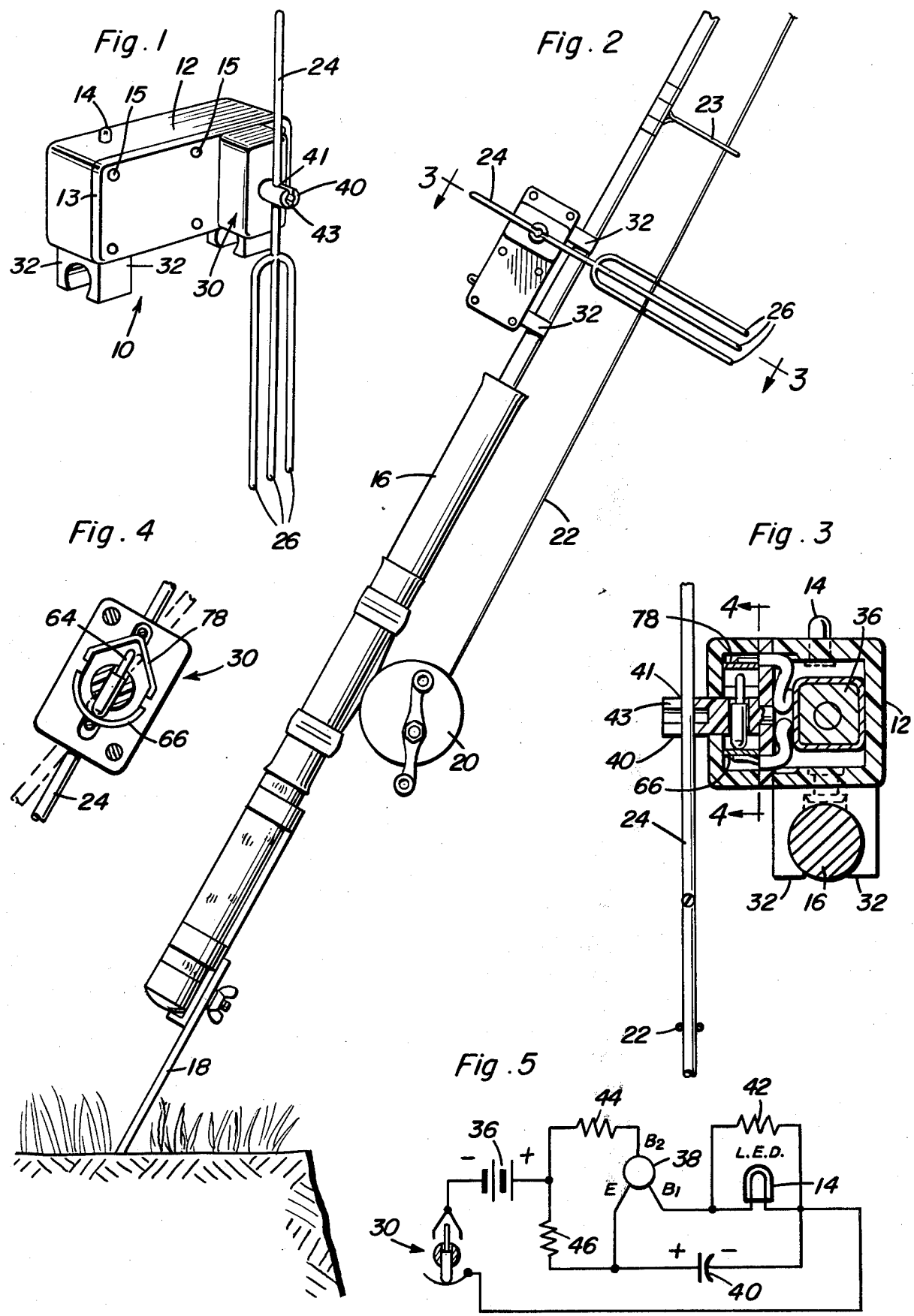

NIGHT FISHING SIGNAL

BACKGROUND OF THE INVENTION

1. Field of the Invention

This invention relates generally to a fishing signal device for use at night. It is designed to be quickly and easily mounted on a fishing rod and has fork lever means for engagement with the fishing line so that movement of said line will actuate the signal device to cause a light signal to be intermittently flashed.

2. Description of the Prior Art

In the past, fishermen have had great problems at night in telling when fish are on the fishing line. During the daytime it is very common for a fisherman to use a rod holder wedged into the shore to hold the fishing rod and to allow the fisherman to relax without physically attending the rod and line. In the daytime it is quite easy for the fisherman to watch the tip of the rod and tell if a fish is nibbling on the bait or on the hook at the end of the line. At night this way of fishing cannot easily be done because often times it is so dark the fisherman cannot easily see the tip of the rod. Various devices are known for signalling when fish are biting or hooked to a line. These known arrangements are generally unsatisfactory for use in the manner of this invention. The following prior art may be pertinent to the invention: U.S. Pat. Nos. 2,530,050; 2,574,333; 2,663,110; 2,195,692; 2,722,763; and 2,777,238.

SUMMARY OF THE INVENTION

An object of the present invention is to provide an easily mountable night fishing signal device for use with a fishing rod and line.

Another object of the present invention is to provide a fishing signal device for use at night which is quite small and entirely self-contained except for the external actuating lever which engages the fishing line.

Still another object of the present invention is a night fishing signal device using a light emitting diode and transistorized circuitry for energization of the diode.

A still further object of the invention is to provide a night fishing signal device which is extremely small, light in weight, easily carried by a fisherman, and easily attached to the fishing rod for use by the fisherman.

These together with other objects and advantages which will become subsequently apparent reside in the details of construction and operation as more fully hereinafter described and claimed, reference being had to the accompanying drawings forming a part hereof, wherein like numerals refer to the like parts throughout.

BRIEF DESCRIPTION OF THE DRAWINGS

FIG. 1 is a perspective view showing the night fishing signal device according to the present invention.

FIG. 2 is a perspective view, reduced in size, of the device in use.

FIG. 3 is a sectional view generally along the line 3—3 of FIG. 2.

FIG. 4 is an enlarged view of the miniature switch arrangement.

FIG. 5 is a schematic diagram of the operating circuit.

DESCRIPTION OF THE PREFERRED EMBODIMENT

Referring now to FIG. 1, numeral 10 refers in general to the entire night fishing signal device. This device has a housing 12, preferably made of flexible, resilient, plastic material. A side panel 13 is attachable to the housing 12 by suitable screws or rivets 15, and a miniature switch shown generally by numeral 30 is mounted on said panel. A light emitting diode 14 projects through a hole made in the top side of the housing for easy viewing by a night fisherman. Brackets are attached to the bottom of the housing which have leg elements 32 for engagement with a fishing rod. The brackets are also preferably made of flexible, resilient, plastic material. This permits the signal device to be mounted on a fishing rod by springing the legs 32 apart and then the resilient legs will frictionally retain the device mounted on the rod in an obvious manner.

The device is so mounted as shown in FIG. 2 by the brackets 32. The fishing rod 16 is shown mounted in a ground holder 18 on the bank of a fishing site and fishing reel 20 with fishing line 22 going past the signal device and through the first guide 23 of the fishing rod. Mounted on an actuating shaft 40 of the miniature switch 30 is an actuating lever 24 having forked tines 26. The lever 24 is frictionally retained in hole 41 of shaft 40 due to the slit 43 and the spring-like action of the arms thus formed at the shaft end. The lever is usable as seen in FIG. 2 by intertwining the fishing line 22 with the tines 26. This lever is also formed of flexible and resilient plastic material which gives just the right amount of tension between the tines and the line to allow movement of the line to actuate the lever 24. Thus, movement of the line and actuation of the lever will in turn cause the normally open switch 30 to be moved to a closed contact position. The lever 24 can also be adjusted sidewise of the shaft 40 due to the friction fit, or entirely removed for ease of storage and carrying of the signal device. This adjustment also allows for control of the overall degree of actuation of switch 30 by the lever 24.

FIGS. 3 and 4 show the switch contacts and internal mechanism of the housing. The switch itself has already been patented, U.S. Pat. No. 3,424,880 by the same inventor as of this invention. For complete details of said switch, reference is herein made to the foregoing patent. However, for the sake of completeness the important details will be mentioned here. As can best be seen in FIGS. 3 and 4, the shaft 40 is rotatable and has contact means 64 for engagement with contact 78. Continuous contact is made with contact member 66 so that slight movement of the element 64 in either direction will complete the circuit by closing the switch, i.e., path 66, 64, 78.

Details of the specific electronic circuit is shown in FIG. 5. This circuit has a transistor of general switch application 38, a light emitting diode 14 of well known type, a capacitor 40, resistors 42, 44 and 46 for appropriate biasing, and so forth. Together with a battery 36 and the miniature switch 30 operation of the circuit in general is as follows: when the switch 30 is closed the battery 36 supplies current to the circuit which when energized will cause the light emitting diode 14 to flash intermittently. All of the elements used in this circuit are of miniature size and therefore all of them can be completely contained within the housing 12 of the fishing signal device. Battery 36 with two of the switch associated wires (for contacts 66, 78) can be seen in the cross sectional view of FIG. 3.

The lever 24 with the forked tines 26 is removably mounted in the shaft 40 so that the signal device may be easily diassembled and carried in one's pocket. The entire signal device is extremely small and light in weight and being entirely self-contained makes it extremely useful to the ordinary fisherman. No provision is made for changing the battery 36 since the transistorized switching circuit and light emitting diode arrangement uses such a slight amount of current that the battery 36 will last for the same amount of time as its normal shelf life. That is, that even under use, the battery will be good for approximately the same amount and length of time that it would be good if not in the circuit. This normally will be many months, even years.

As can be readily seen, this new and novel night fishing signal device can be easily mounted for use, normally has no maintenance problems, and at night will give the fisherman an easily seen signal whenever the line is moved by a curious fish.

For the sake of completeness, the general dimensions of this novel fishing signal device are listed. The housing 12, 13 is normally approximately 2⅜ inches long, approximately 1 inch square, with the bracket switch fastened to the housing being approximately ½ by ½ inch. The switch 30 is approximately 5/16 of an inch thick and ⅞ inch by ½ inch across. The lever 24 with tines 26 is a little less than 6 inches in total length with the tines being approximately 3 inches in total length. Thus, from these dimensions, it can be readily appreciated how small and compact this device really is.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A night fishing signal device for signalling to a fisherman movement of the fishing line, a small, lightweight housing containing signal means for mounting on a fishing pole, an actuating means for contact with a fishing line to trigger the signal means, the actuating means including a lever having forked tines at one end thereof which is removably mounted on a miniature switch mounted on the housing, the housing being made from resilient plastic material and mounting brackets of similar material being attached to said housing to allow the device to be readily mounted in friction engagement with a fishing rod, and the signal means includes a solid state light emitting diode projecting from the housing, the housing containing transistorized circuitry for energizing the light emitting diode in an intermittent manner, further power source means for energizing the transistorized circuitry which need not be replaced for the entire life of the device, and the entire transistorized circuitry including the power source means being completely self-contained within the signal device housing.

2. The device of claim 1, wherein the fishing line engaging lever having forked tines is made of resilient and flexible plastic material and includes an elongated member slidable through and frictionally retained in a hole in an actuating shaft of the miniature switch, and the forked tines include at least three members extending from the other end of the elongated member and parallel thereto so the fishing line may be intertwined therethrough which gives just the right amount of tension between the tines and the line to allow movement of the fishing line to actuate the lever and thus the switch to effect operation of the transistorized circuitry and the light emitting diode.

* * * * *